US008416985B2

(12) United States Patent
Martin et al.

(10) Patent No.: US 8,416,985 B2
(45) Date of Patent: Apr. 9, 2013

(54) METHOD, SYSTEM AND COMPUTER PROGRAM PRODUCT FOR PROVIDING GROUP INTERACTIVITY WITH ENTERTAINMENT EXPERIENCES

(75) Inventors: Ernest L. Martin, Orlando, FL (US); Peter Stepniewicz, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 1511 days.

(21) Appl. No.: 11/959,059

(22) Filed: Dec. 18, 2007

(65) Prior Publication Data

US 2008/0168485 A1 Jul. 10, 2008

Related U.S. Application Data

(60) Provisional application No. 60/870,423, filed on Dec. 18, 2006.

(51) Int. Cl.
*G06K 9/00* (2006.01)
*G06F 3/00* (2006.01)

(52) U.S. Cl. ........................................ 382/103; 715/744

(58) Field of Classification Search .................. 382/103; 725/35; 715/744; 700/245
See application file for complete search history.

(56) References Cited

U.S. PATENT DOCUMENTS 5,365,266 A * 11/1994 Carpenter ....................... 348/61
5,534,917 A 7/1996 MacDougall
5,993,314 A 11/1999 Dannenberg et al.
6,243,740 B1 6/2001 Minneman et al.
6,409,599 B1 * 6/2002 Sprout et al. .................... 463/31
6,718,551 B1 * 4/2004 Swix et al. ...................... 725/32
6,873,710 B1 * 3/2005 Cohen-Solal et al. ........ 382/100
6,945,870 B2 * 9/2005 Gatto et al. ..................... 463/29
7,594,245 B2 * 9/2009 Sezan et al. ..................... 725/46
7,596,241 B2 * 9/2009 Rittscher et al. .............. 382/103
2002/0049690 A1 * 4/2002 Takano ........................... 706/47
2002/0059650 A1 * 5/2002 Lyda ............................. 725/153
2002/0073417 A1 * 6/2002 Kondo et al. ................... 725/10
2003/0229900 A1 * 12/2003 Reisman ......................... 725/87
2004/0031058 A1 * 2/2004 Reisman ....................... 725/112
2004/0117815 A1 * 6/2004 Kondo et al. ................... 725/12
2005/0246063 A1 * 11/2005 Oonaka ......................... 700/245
2006/0039584 A1 * 2/2006 Aichi ............................ 382/107
2006/0192852 A1 8/2006 Rosenthal et al.
2006/0258457 A1 * 11/2006 Brigham ......................... 463/36
2007/0030343 A1 * 2/2007 Rohde ............................. 348/47
2007/0156883 A1 * 7/2007 Thompson et al. ........... 709/223
2007/0271518 A1 * 11/2007 Tischer et al. ................ 715/744
2007/0271580 A1 * 11/2007 Tischer et al. .................. 725/35
2007/0294126 A1 * 12/2007 Maggio ........................... 705/10

OTHER PUBLICATIONS

PCT Notification of Transmittal of the International Search Report and Written Opinion, Jun. 6, 2008, International Application No. PCT/US07/25922, Applicant Disney Enterprises, Inc.

(Continued)

*Primary Examiner* — Wenpeng Chen
(74) *Attorney, Agent, or Firm* — Ference & Associates LLC

(57) ABSTRACT

The present invention provides a system and method system for providing group interactivity. The system includes a module that determines a size of an audience in an image provided by an image acquisition device and a module that controls interaction in a small audience environment. In addition, the system includes a module that controls interaction in a large audience environment. The present invention can also be viewed as a method for providing group interactivity. The method operates by determining size of an audience in a image, interacting in a small audience environment and interacting in a large audience environment.

16 Claims, 10 Drawing Sheets

OTHER PUBLICATIONS

Todd Williams, Cinematrix Interactive Audience Participation Technology, [online]; [retrieved on Apr. 11, 2008]; retrieved from the Internet http://www.cinematrix.com/fixed.html http://cinematrix.info/EN/testimonials.html.

Maynes-Aminzade, Dan, et al., "Techniques for Interactive Audience Participation", Proceedings of the Fourth IEEE International Conference on Multimodal Interfaces (ICMI '02), 6 pages, 2002.

* cited by examiner

METHOD, SYSTEM AND COMPUTER PROGRAM PRODUCT FOR PROVIDING GROUP INTERACTIVITY WITH ENTERTAINMENT EXPERIENCES

CROSS-REFERENCE TO RELATED APPLICATION

This application claims priority to U.S. provisional application entitled, "METHOD, SYSTEM AND COMPUTER PROGRAM PRODUCT FOR PROVIDING GROUP INTERACTIVITY WITH ENTERTAINMENT EXPERIENCES," having Ser. No. 60/870,423, filed Dec. 18, 2006, which is entirely incorporated herein by reference.

FIELD OF THE INVENTION

Embodiments of the invention relate generally to interacting with an entertainment experience, and in particular to providing group interactivity with an entertainment experience.

BACKGROUND OF THE INVENTION

Video image based control systems for controlling the operation of a device in response to the movement of a participant in the field of view of a video camera are known in the art. One prior art system includes a video camera which scans a field of view in which a participant stands. The output of the video camera is applied to a video digitizer which provides digital output to a computer. The computer analyses and processes the digital information received from the digitizer and depending on the movement or position of the participant within the field of view of the video camera, provides control signals to dependent control devices connected thereto. Thus, the operation of the dependant control device can be controlled by the movement or positioning of the participant within the field of view of the video camera.

Other attempts have been made to develop similar types of systems. One is an apparatus which uses the image of a human to control real-time computer events. Data representing a participant are gathered via a camera and applied to a processor. The processor analyses the data to detect certain features of the image and the results of the analysis are expressed to the participant using devices controlled by a computer.

Although the above-mentioned systems allow a device to be controlled through movement or positioning of a participant within the field of view of a camera, the type of control offered by these prior art systems is limited and thus, these prior art devices have limited usefulness in environments which require more sophisticated control. It is therefore an object of the present invention to provide a novel video image based control system.

SUMMARY OF THE INVENTION

Embodiments of the present invention provide a system and method for providing group interactivity with entertainment experiences. Briefly described, in architecture, one embodiment of the system, among others, can be implemented as follows. The system includes a module that determines a size of an audience in an image provided by an image acquisition device and a module that controls interaction in a small audience environment. In addition, the system includes a module that controls interaction in a large audience environment.

Embodiments of the present invention can also be viewed as providing group interactivity. In this regard, one embodiment of such a method, among others, can be broadly summarized by the following steps. The method operates by determining size of an audience in an image, interacting in a small audience environment and interacting in a large audience environment.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims. Embodiments of the present invention provide a system and method for providing group interactivity with entertainment experiences. Briefly described, in architecture, one embodiment of the system, among others, can be implemented as follows. The system includes a module that determines a size of an audience in an image provided by an image acquisition device and a module that controls interaction in a small audience environment. In addition, the system includes a module that controls interaction in a large audience environment.

BRIEF DESCRIPTION OF THE DRAWINGS

Features, aspects and advantages of the apparatus and methods of the embodiments of the invention will become better understood with regard to the following description and accompanying drawings.

DESCRIPTION OF EXEMPLARY EMBODIMENTS

Embodiments of the invention enable members of an audience to participate, either cooperatively or competitively, in shared entertainment experiences such as audio-visual entertainment experiences. Embodiments allow audiences of varying size, ranging from one to hundreds of participants to control onscreen activities (e.g., games) by (i) controlling the operation of an object in response to the movement of participants in the field of view of a video camera (ii) controlling the operation of an object in response to movement of participants within a specific area or multiple areas in the field of view of one or more video cameras and/or (iii) controlling the operation of an object in response to audience audio levels.

User input in most entertainment experiences consists of a combination of one-dimensional axes of control (e.g., x coordinate, y coordinate, speed, rotation angle, etc.) and discrete on/off inputs (e.g., fire, jump, duck, etc.). For a large audience to jointly control or participate in such an experience, they require a method to individually express such a set of inputs as well as a procedure by which their individual contributions can be aggregated into a net group input effect.

Embodiments of the invention utilize axis controls that are affected by observing participants in the field of view of one or more image capturing devices including, but are not limited to, video cameras, thermal imaging cameras, laser rangefinders, and the like. This is accomplished by performing frame-by-frame comparisons within the digitized information stream to detect motion relative to a reference frame. The degree and direction of motion is measured for each participant in the frame and summed up across the image to yield a net input value.

Figure 1A:
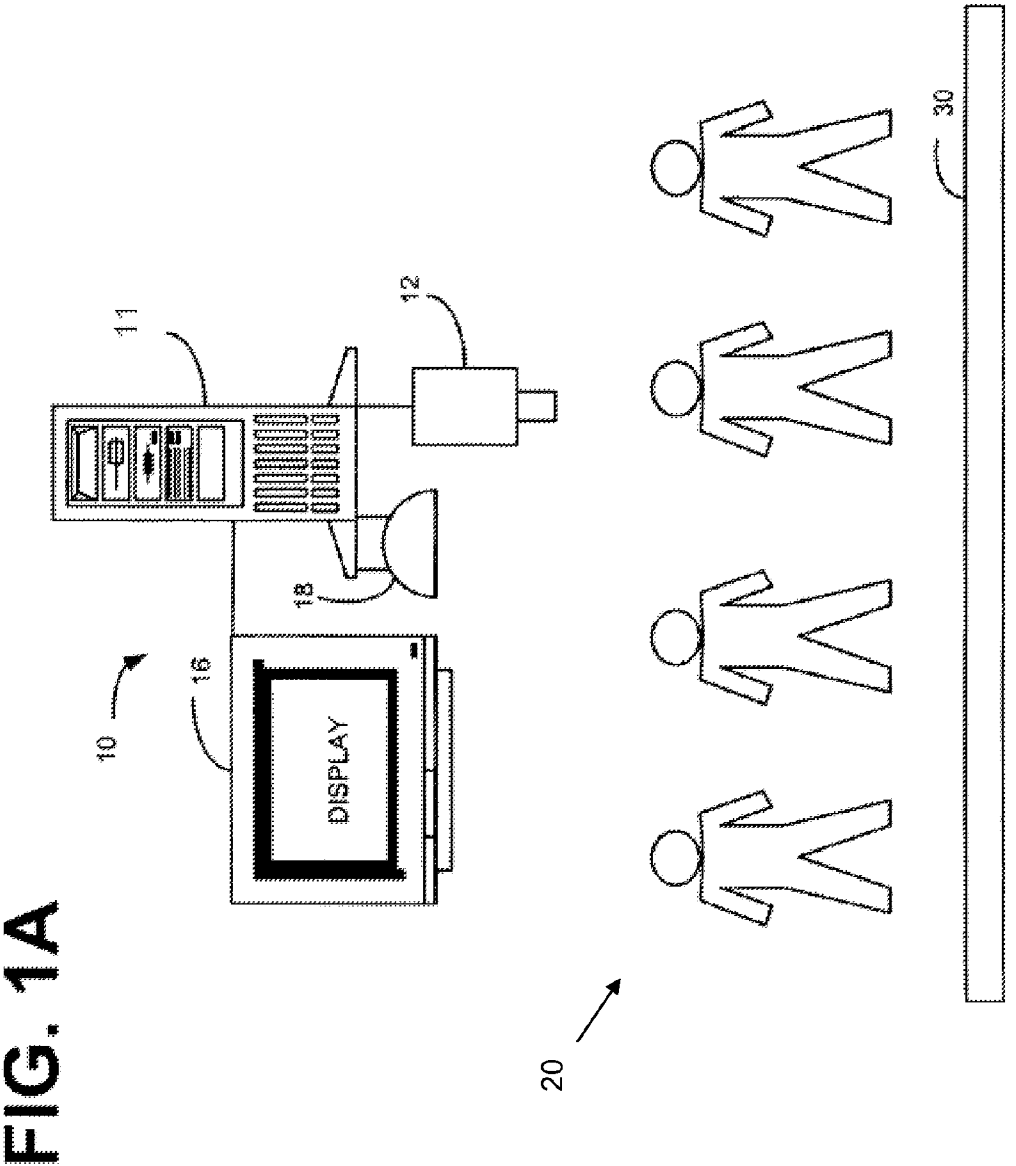
FIGS. 1(A-C) are block diagrams illustrating an example of a system for providing group interactivity.

FIGS. 1(A-C) are block diagrams illustrating an example of a system for providing group interactivity 10 to enable members of an audience to participate, either cooperatively or competitively, in shared entertainment experiences such as audio-visual entertainment experiences. System 10 includes input devices including a video input device 12 (e.g., a digital camera) and an audio input device 18 (e.g., microphone). The input devices provide video and audio output signals to a computer 11.

A display 16 provides video and audio output to an audience including participants 20. The participants 20 are positioned adjacent to a background shown representatively as element 30. It is understood that the background 30 refers to the surroundings, and may include items behind, in front of and adjacent to the participants 20. As described in further detail herein the participants 20 can interact with an entertainment experience presented on display 16 though body movements captured by camera 12 and sounds captured by microphone 18.

Figure 1B:
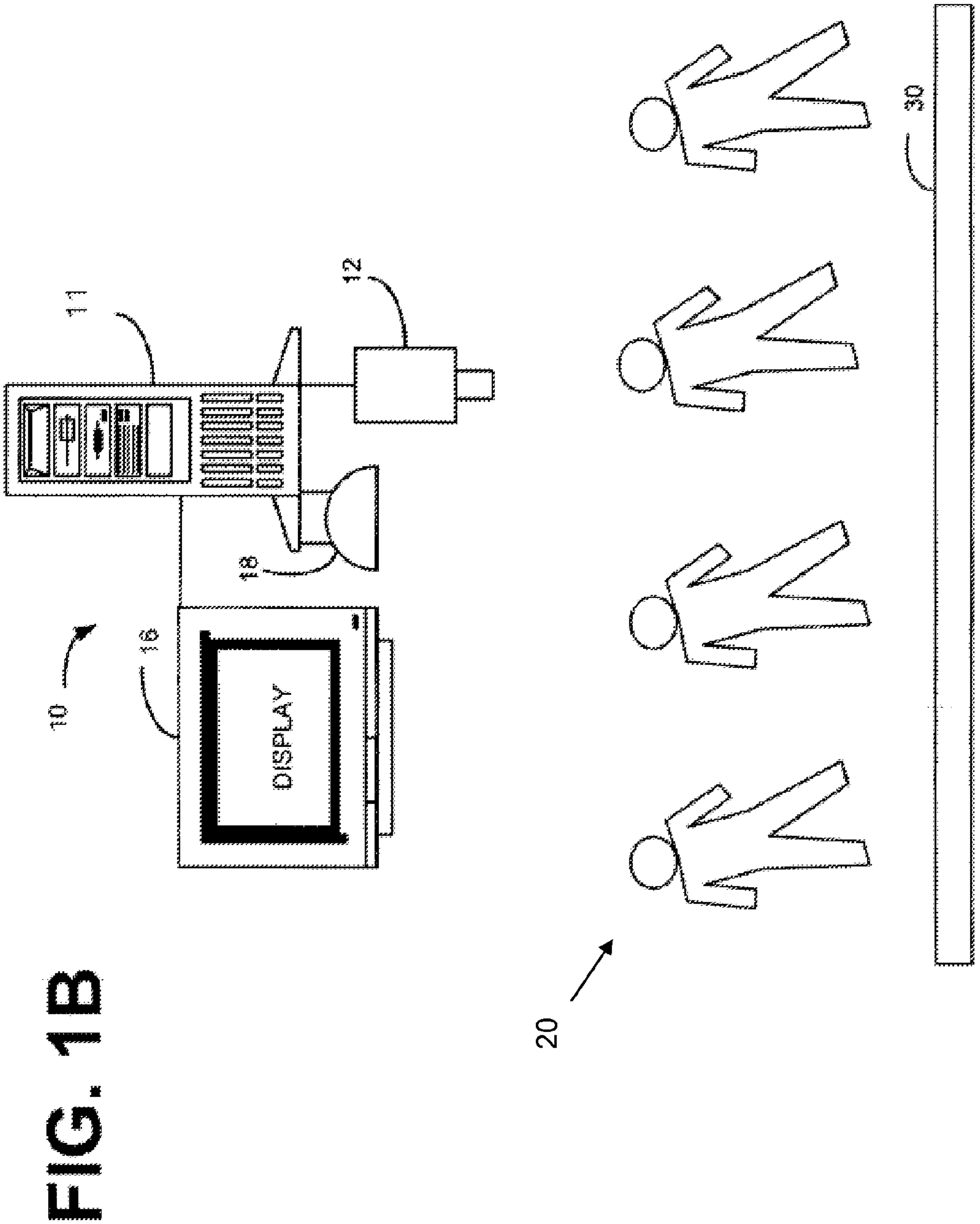
Figure 1C:
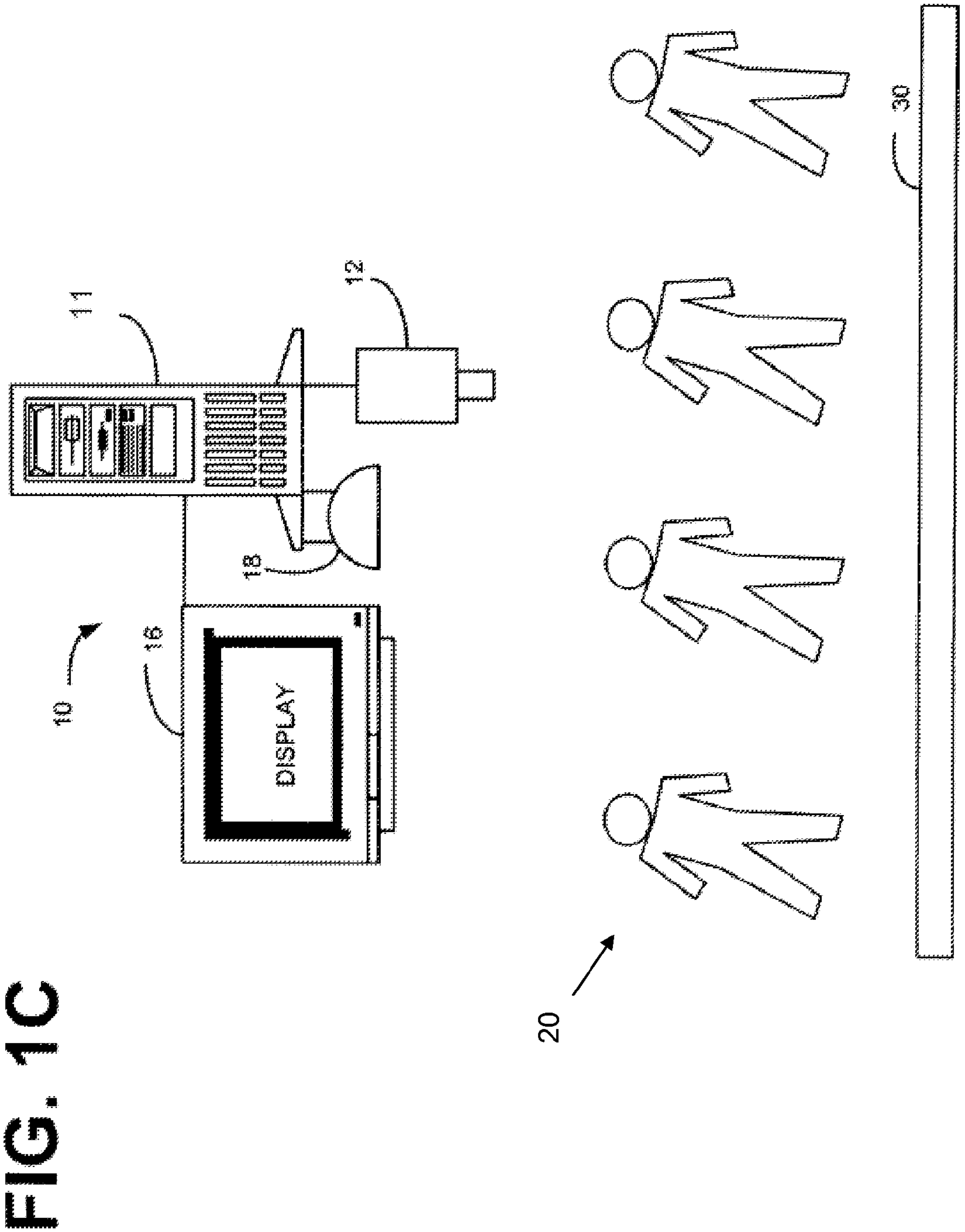
Figure 4:
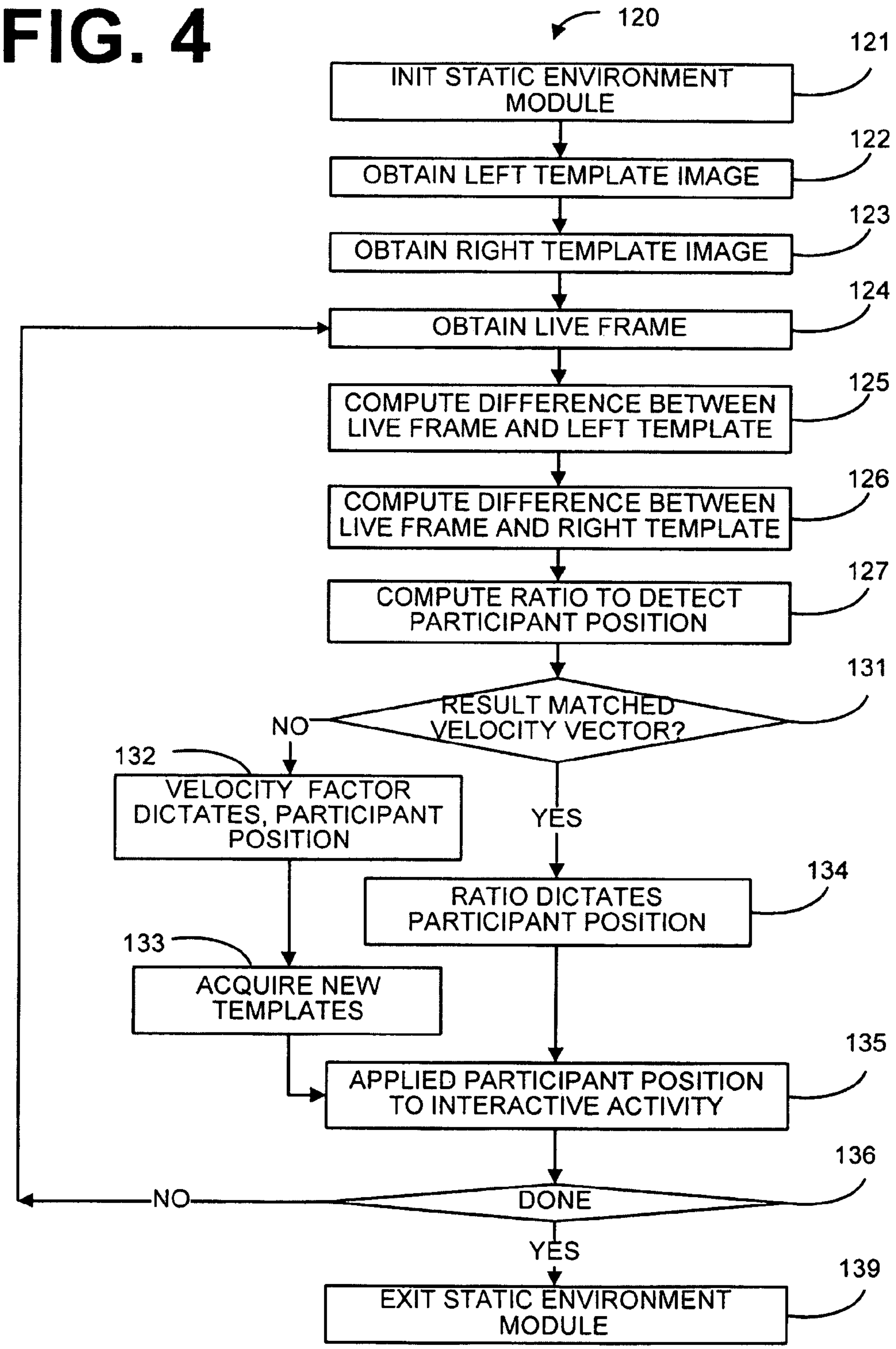
FIG. 4 is a flow chart illustrating an example of the operation of the process for static detecting participant position on the computer that is utilized in the autonomic group interactivity system of the present invention, as shown in FIGS. 1-3.

The following example is used to illustrate operation of system 10, and is not intended to limit embodiments of the invention. In this example, participants 20 are directed to lean to their right or lean to their left in order to control a character on display 16. Processing associated with this example is illustrated in FIG. 4. The process begins where participants 20 lean to their left (as shown in FIG. 1B) and the computer 11 captures a template image referred to as a left template image. Next, participants 20 lean to their right (as shown in FIG. 1C) and the computer 11 captures a template image referred to as a right template image. Once the left and right template images are obtained, the interactive entertainment experience begins.

As the interactive activity progresses, there are times during the activity when the participant location controls the experience. The camera 12 provides live image frames of the participants 20 and provides the live image frames to computer 11. When participant activity is needed for controlling the entertainment experience, computer 11 acquires one or more live image frames. Computer 11 may also continuously capture and buffer live image frames. Computer 11 computes the difference between the live image frame and left template image to obtain a left image difference.

In exemplary embodiments, the difference is acquired by subtracting pixel intensity values between the left image template and the live image frame. If the left template image and the live image frame are similar, the left image difference will approach zero. Otherwise, if the left template image and the live frame are substantially different, the left difference will be large. A similar calculation issued to obtain a right difference, by computing a difference between the right template image and the live image.

Figure 2:
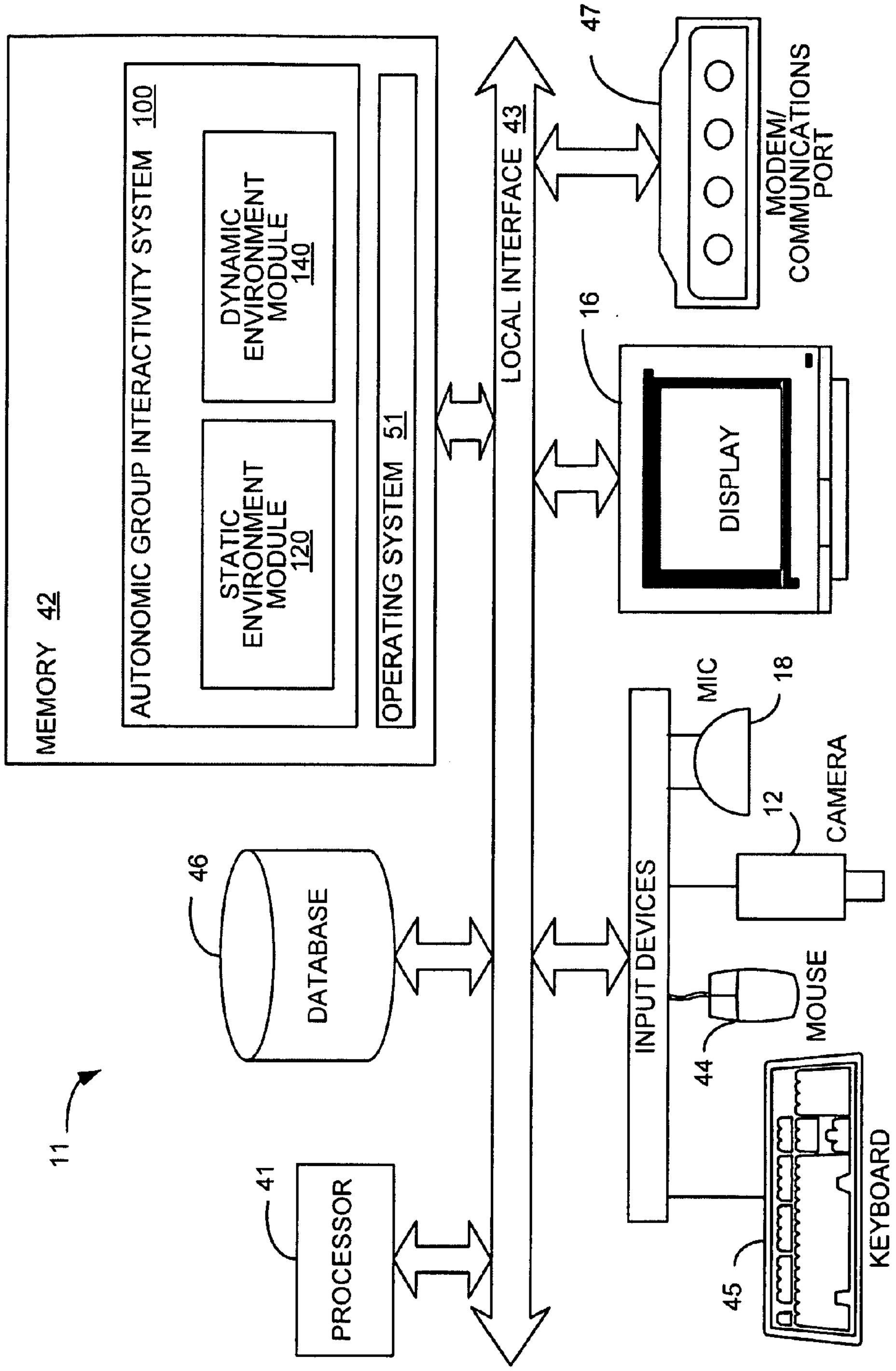
FIG. 2 is a block diagram illustrating an example of a computer utilizing the autonomic group interactivity system of the present invention.

FIG. 2 is a block diagram illustrating an example of a computer 11 utilizing the autonomic group interactivity system 100 of the present invention. Computer 11 includes, but is not limited to, PCs, workstations, laptops, PDAs, palm devices and the like. Generally, in terms of hardware architecture, as shown in FIG. 2, the computer 11 include a processor 41, memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the computer 11, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51, and the autonomic group interactivity system 10 of the present invention. As illustrated, the autonomic group interactivity system 10 of the present invention comprises numerous functional components including, but not limited to, a static environment module 120 and a dynamic environment module 140.

A non-exhaustive list of examples of suitable commercially available operating systems 51 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a Linux operating system, (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 51 essentially controls the execution of other computer programs, and provides scheduling, input-output control, file and data management, memory management, and communication control and related services. It is contemplated by the inventors that the autonomic group interactivity system 10 of the present invention is applicable on all other commercially available operating systems.

The autonomic group interactivity system 100 may be a source program, executable program (object code), script, or any other entity comprising a set of instructions to be performed. When a source program, then the program is usually translated via a compiler, assembler, interpreter, or the like, which may or may not be included within the memory 42, so as to operate properly in connection with the O/S 51. Furthermore, the autonomic group interactivity system 100 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, NET, and the like.

The I/O devices may include input devices, for example but not limited to, a mouse 44, keyboard 45, scanner (not shown), camera 12 microphone (18), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the computer 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the computer 11 is activated.

When the computer 11 is in operation, the processor 41 is configured to execute software stored within the memory 42, to communicate data to and from the memory 42, and to generally control operations of the computer 11 are pursuant to the software. The autonomic group interactivity system 10 and the O/S 51 are read, in whole or in part, by the processor 41, perhaps buffered within the processor 41, and then executed.

When the autonomic group interactivity system 10 is implemented in software, as is shown in FIG. 1, it should be noted that the autonomic group interactivity system 10 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method.

The autonomic group interactivity system 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In an alternative embodiment, where the autonomic group interactivity system 10 is implemented in hardware, the autonomic group interactivity system 10 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
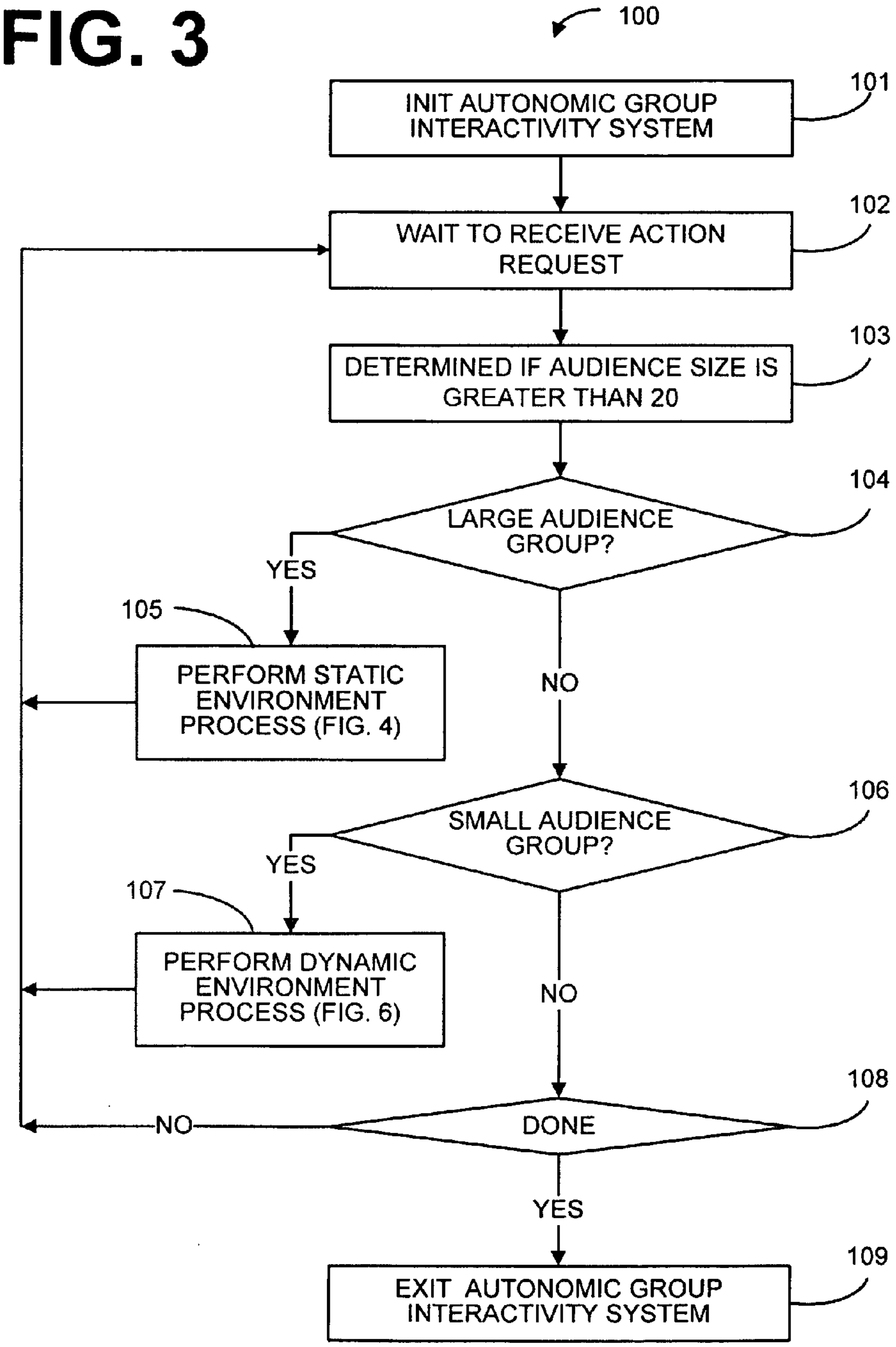
FIG. 3 is a flow chart illustrating an example of the operation of the autonomic group interactivity system for the system providing group interactivity of the present invention, as shown in FIG. 1.

FIG. 3 is a flow chart illustrating an example of the operation of the autonomic group interactivity system 10 of the present invention, as shown in FIGS. 1 and 2. The autonomic group interactivity system 10 virtualizes determines the size of the audience to determine the appropriate environment processing for group interaction. For large groups, a static environment process is utilized. The static environment processes is herein described in further detail with regard FIG. 4. In instances where a smaller audiences is detected, a dynamic environment process is utilized. The dynamic environment processes is herein defined for the detail with regard to FIG. 5.

First at step 101, the autonomic group interactivity system 10 is initialized. This initialization may include startup routines and processes embedded in the BIOS of the computer 11. The initialization also includes the establishment of data values for particular data structures utilized in the autonomic group interactivity system 10.

Next at step 102, the autonomic group interactivity system 10 waits to receive an action request. Upon receiving an action request, the autonomic group interactivity system 10 then determines if the audience size is greater than 20. In one embodiment, this determination is made by the operator of the autonomic group interactivity system 10. When the operator chooses which module to use, they use first-hand knowledge of the working environment and camera placement to achieve best results. In another embodiment, the autonomic group interactivity system 10 automatically determines the size of the audience.

Based on real-world experience with the implemented system, the small-audience environment module works best in an open play space, when participants are not fixed to their location. Rather than lean, participants are encouraged to move about, resulting in net pixel translation. Each individual participant has a relatively large impact on the net input due to their close proximity and relatively large frame size in the captured image.

The large-audience module works best in a more controlled environment (such as a theater), where participants are fixed to their positions (theater seats). Leaning works best in this case. These scenarios tend to have more static lighting, and each individual participant's contribution is low.

At step 104, it is determined if the audience size is a large audience group. If it is determined that the audience group is not large, then the autonomic group interactivity system 10 proceeds to step 106. However, if it is determined at step 104 that the audience size is a large group, then the autonomic group interactivity system 10 performs the static environment process at step 105. The static environment process is herein defined for the detail with regard to FIG. 4. The autonomic group interactivity system 10 then returns to step 102 to wait to receive the next action request.

At step 106, the autonomic group interactivity system 10 determines if the audience size is a small group. It is determined at step 106, that the audience group is not a small audience, than the autonomic group interactivity system 10 proceeds to step 108. However, it is determined at step 106 that the audience size is a small group, then the autonomic group interactivity system 10 performs that dynamic environment process at step 107. The dynamic environment process is herein defined for the detail with regard FIG. 6. The autonomic group interactivity system 10 then returns to step 102 to wait to receive the next action request.

At step 108, the autonomic group interactivity system 10 determines if the action requested is to exit. If it is determined at step 108 that the action request is not to exit, then the autonomic group interactivity system 10 returns to step 102 to wait for the next action request. However, if it is determined at step 108 that the action request received was to exit, then the autonomic group interactivity system 10 exits at step 109.

FIG. 4 is a flow chart illustrating an example of the operation of the static environment module 120 for detecting participant position on the computer 11 that is utilized in the autonomic group interactivity system 10 of the present invention, as shown in FIGS. 1-3. The static environment module is utilized for larger audience groups. The preferred range for larger audiences includes, but is not limited to 50 to 500 participants.

First at step 121, the static environment module 120 is initialized. This initialization may include startup routines and processes embedded in the BIOS of the computer 11. The initialization also includes the establishment of data values for particular data structures utilized in the static environment module 120.

At step 122, the static environment module 120 obtains the left template image. In the illustrated example, participants 20 lean to their left (as shown in FIG. 1B) and the computer 11 captures a template image referred to as a left template image.

At step 123, static environment module 120 obtains the right template image. In the illustrated example, participants 20 lean to their right (as shown in FIG. 1C) and the computer 11 captures a template image referred to as a right template image. Once the left and right template images are obtained, the interactive entertainment experience begins.

As the interactive activity progresses, there are times during the activity when the participant location controls the experience. At step 124, a static environment module 120 then obtains a live frame image. The camera 12 provides live image frames of the participants 20 and provides the live image frames to computer 11. When participant activity is needed for controlling the entertainment experience, computer 11 acquires one or more live image frames. Computer 11 may also continuously capture and buffer live image frames. Computer 11 computes the difference between the live image frame and left template image to obtain a left image difference.

In exemplary embodiments, the difference is acquired by subtracting pixel intensity values between the left image template and the live image frame. At step 125, the static environment module 120 computes the difference between the live frame image and the left template image. If the left template image and the live image frame are similar, the left image difference will approach zero. Otherwise, if the left template image and the live frame are substantially different, the left difference will be large.

A similar calculation issued to obtain a right difference, by computing a difference between the right template image and the live image. At step 126, the static environment module 120 computes the difference between the live frame image in the right template image.

At step 127, the static environment module 120 computes a ratio to detect participant position. The ratio is derived based on the left difference/(left difference+right difference). If the left difference is small, this ratio will approach zero, indicating that the participants are leaning left. If the left difference is large, this ratio will approach 1, indicating that the participants are leaning right. In most instances, the raw value of the ratio would be used directly to output a continuous range of position values, i.e. the resulting position value would not be simply left or right but could be essentially anywhere in between based on the degree of agreement within the audience as well as how far each individual is leaning, translated, etc.

In one embodiment, thresholds may be compared to the ratio to decide the direction of the participants. For example, a ratio of less than 0.2 indicates participants leaning left and a ratio of greater than 0.8 indicates participants leaning right.

The ratio derived in step 127 may be sufficient to determine the direction that participants are leaning. There are, however, situations where the participants' position extends beyond the original left or right template which can result in a false measure of position. To confirm the ratio of step 127, a velocity vector may be derived.

At step 131, the static environment module 120 determines if the ratio result matched a velocity vector. The result of the ratio from step 127 is compared to the velocity vector to determine if they both indicate the same motion by the participants. If the directions match, then flow proceeds to step 134 where the ratio is used to indicate participant motion. The static environment module 120 then proceeds to step 135.

If it is determined at step 131 that the ratio result does match a velocity vector, the static environment module 120 then proceeds to step 134. However, if the position indicated by the ratio does not match the velocity vector at step 131, then the static environment module 120 proceeds to step 132 where the velocity vector is used to indicate position of the participants.

At step 133, the static environment module 120 acquires new left and right image templates. For example, if the participants have moved beyond the left template image (as indicated by the ratio not matching the velocity vector and the velocity vector points left) then a new left template image is acquired.

At step 135, the computer 11 applies the participant position and/or velocity data as an input to the interactive entertainment experience and updates the display accordingly.

At step 136, the static environment module 120 determines the more live frames are to be obtained. If it is determined at step 136 that there are more live frames to be obtained, then the static environment module 120 returns to repeat steps 124 through 136. However, if it is determined at step 136 that there are no more live frames to be obtained, then the static environment module 120 exits the step 139.

The above example relates to participants leaning left or right in order to control an interactive entertainment experience. It is understood that embodiments of the invention are not limited to participants leaning left or leaning right. Any type and number of motions may be used to establish template images to which the live frames are compared to perform the process of the static environment module 120.

Figure 5A:
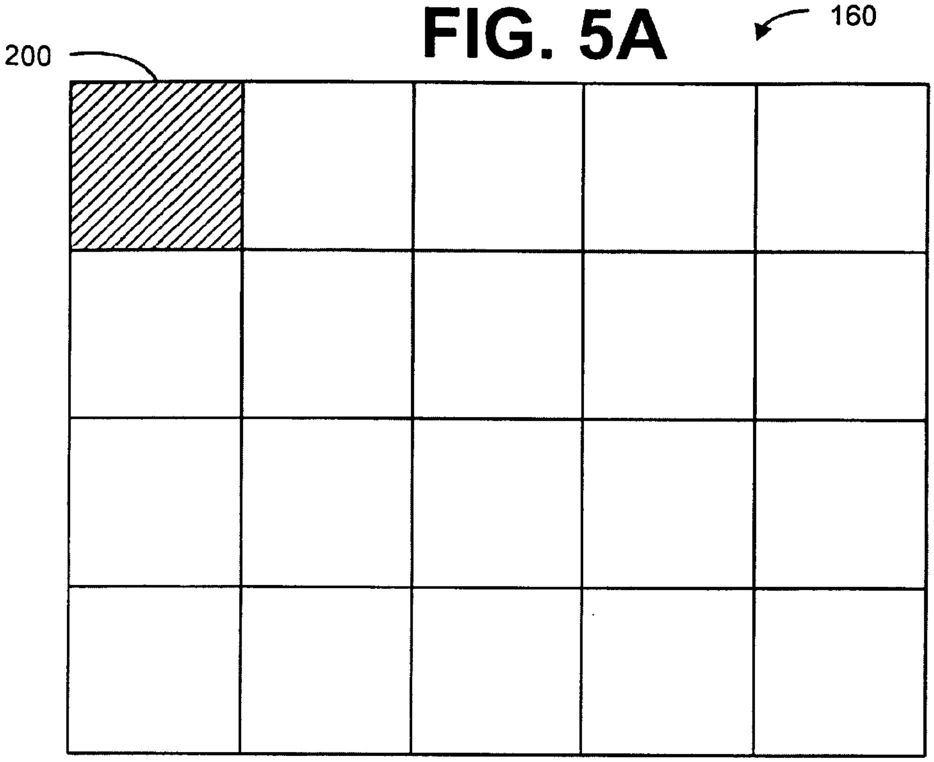
FIGS. 5A and 5B are block diagrams illustrating an example of tracking a pixel for vector analysis.
Figure 5B:
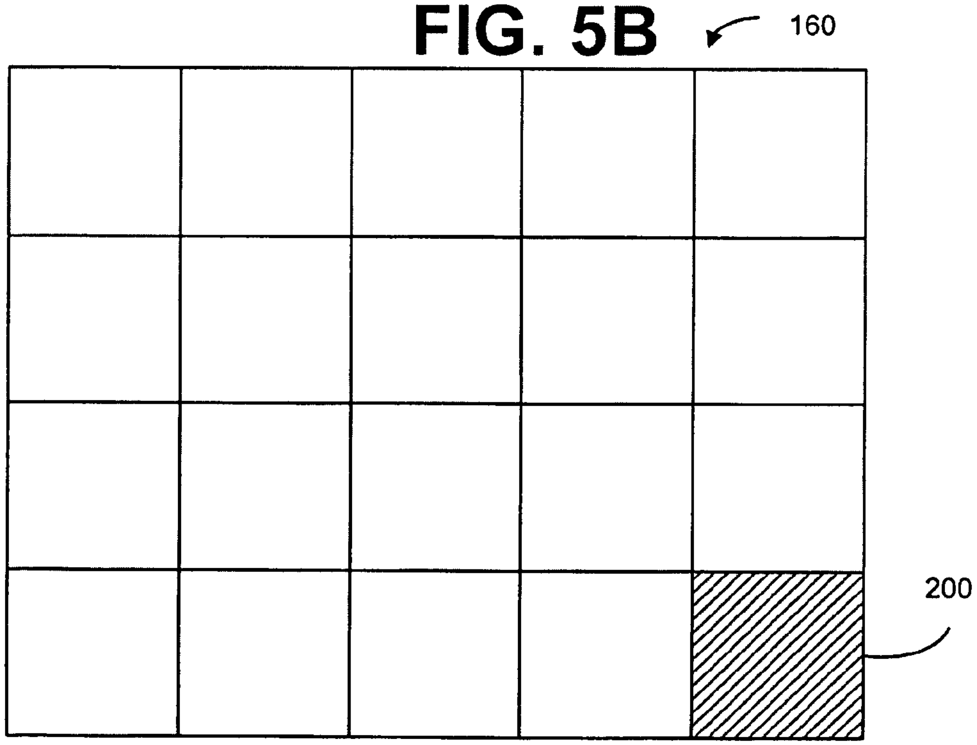

FIGS. 5A and 5B illustrate tracking a pixel in two frames, where FIG. 5B occurs after FIG. 5A. One or more pixels of interest of identified. These may correspond to a certain color, for example red. The position of the pixel or pixels is determined in the first frame and the second frame to detect the motion of the frame. In the example in FIGS. 5A and 5B, the pixel 200 has moved from left to right in the live image frames. This correlates to a physical motion of the participant from their right to their left. Thus, a velocity vector can be derived by analyzing one or more pixels or groups of pixels.

In alternate embodiments of the invention, a background template image is used as the template to which subsequent live image frames are compared. This embodiment is useful in situations where the participants enter and exit the interactive experience area, which makes the process of the static environment module 120 (FIG. 4) more difficult to apply.

Figure 6:
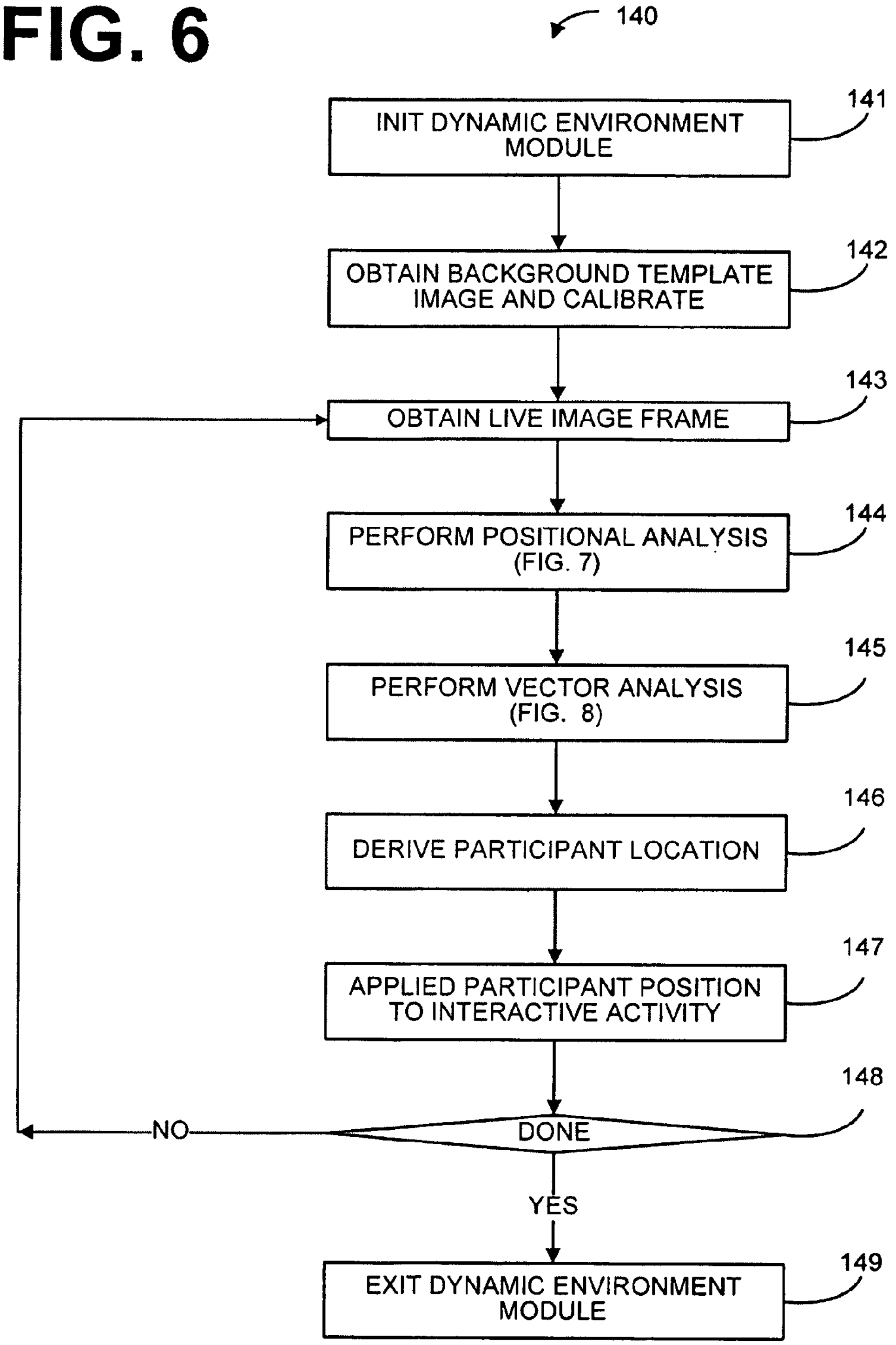
FIG. 6 is a flow chart illustrating an example of the operation of the process for dynamic detecting participant position on the computer that is utilized in the autonomic group interactivity system of the present invention, as shown in FIGS. 1-3.

FIG. 6 is a flow chart illustrating an example of the operation of the dynamic environment module 140 for detecting participant position on the computer 11 that is utilized in the autonomic group interactivity system 10 of the present invention, as shown in FIGS. 1-3. The dynamic environment module 140 is more suitable for smaller audience environments and can be utilized without constant calibrations. The dynamic environment module is robust to audience changes.

First at step 141, the dynamic environment module 140 is initialized. This initialization may include startup routines and processes embedded in the BIOS of the computer 11. The initialization also includes the establishment of data values for particular data structures utilized in the dynamic environment module 140.

At step 142, the dynamic environment module 140 acquires a background template image and computes threshold of values (i.e. at least one threshold value) to calibrate the operation. This is performed by camera 12 imaging background 30 and storing the image frame in memory 42. Once the background template is captured, the system may optionally capture and analyze a sequence of subsequent live frames, prior to commencing normal game play, to establish the sensitivity and stability of the motion tracking. This is achieved by taking each captured frame and comparing it pixel by pixel against the reference template image.

During this calibration refinement and configuration stage, the play area should remain empty of participants, and ideally no or very few pixel differences above the threshold should be detected. If the lighting levels in the play area are low or somewhat inconsistent, or if there are components of the background that are in motion, then some dynamic pixels will likely be detected, and this becomes an opportunity to adjust the threshold and alleviate some of this unwanted "noise". The threshold is optimally set at a value just below the point where a significant amount of this "noise" is detected. A threshold set at this optimal level maximizes the sensitivity of the motion tracking to detect participant presence or motion with minimal interference, or false positive detection of background noise.

Once the system is calibrated, participants may enter the field of play, and normal game play may commence. During game play live frames will be captured and analyzed periodically or at key points to allow participants to control and interact with the game play experience. This is accomplished by the following series of steps: Capture a Live Frame; Identify Pixels of Interest; Calculate the Net Position Value; and Calculate the Resulting Axis Value. The Calculate the Net Position Value; and Calculate the Resulting Axis Value steps are herein defined in further detail with regard to FIGS. 7 and 8.

As for capture of a Live Frame. A live frame of video is captured by the camera device, with one or more participants active in the field of view. This frame will be analyzed to determine participant positions and a resulting collection of net input values for each control axis currently defined in the game.

Identify Pixels of Interest. The captured image frame is compared to the background template frame, using the differencing technique previously described along with the configured threshold value to identify pixels of interest. A pixel of interest is any whose sum of squared differences from the template frame exceeds the threshold value.

At step 143, live image frames including participants are acquired by camera 12 and provided to computer 11. At step 144, the processor performs position analysis to determine participant locations. The positional analysis is herein described in further detail with regard to FIG. 7. For example, a difference may be obtained between the live image and the background template image. Where there is substantial difference indicates that participants have moved into those locations. Where there is little difference, this indicates that participants are not in these locations. The positional analysis may be performed across multiple frames to indicate how participants are moving relative (e.g., right to left) to the background. The comparison process consists of a sum of squared differences of each pixel's color components' intensities.

To illustrate mathematically how this differencing is carried out, here are a couple of simple examples.

EXAMPLE 1

16 bit Grayscale Pixel Comparison. Consider a template image containing Pixel0 with a 16 bit intensity value of 32000, and a subsequently captured comparison image containing Pixel1 at the same image coordinates, but now with an intensity value of 32002. The difference is obtained by subtracting one value from the other and then squaring the result.

| Template Image | Compared Image |
| --- | --- |
| Pixel0: 32000 | Pixel1: 32002 |
| Difference = (32002 − 32000)^2 = 2^2 = 4 | |

EXAMPLE 2

32 bit RGB Pixel Comparison. Consider the same situation as Example 1, except now the pixels are formatted as 32 bit RGB color values, so say Pixel0 in the template image has component intensities of R:128, G:200, & B:64 and Pixel1 in the comparison image has component intensities of R:130, G:190, & B:64. Then the difference in this case is obtained by individually subtracting each component pair, squaring their individual results, and then summing them together.

| Template Image | Compared Image |
| --- | --- |
| Pixel0: R: 128, G: 200, B: 64 | Pixel1: R: 130, G: 190, B: 64 |
| Difference = (130 − 128)^2 + (190 − 200)^2 + (64 − 64)^2 = 2^2 + (−10)^2 + 0^2 = 104 | |

The difference result for each pixel comparison is then compared to a configurable threshold value to determine the significance of the difference. Differences above this threshold value indicate motion or a change in the environment. Differences below the threshold indicate that the background at this pixel location is unchanged and unobstructed by a participant.

At step 145, vector analysis may be used track participants' movement across multiple frames. The vector analysis is herein described in further detail with regard to FIG. 8. As described above with reference to FIGS. 5A and 5B, one or more pixels and/or groups of pixels may be tracked across two or more frames to determine the motion of participants. The vector analysis may represent motion in two dimensions across an image frame to provide participants with more options for interacting with the entertainment activity.

Once position values and resulting axis values have been derived from the active frame, the interactive activity, (e.g. game) then incorporates these values to provide feedback and interactivity to the participants. For a simple example, imagine an interactive activity where one player region is defined that comprises the full camera frame and provides horizontal control to allow participants to move a sprite on a display screen left and right. In this instance, an input value of −1 could correspond to the sprite's leftmost position, +1 to its rightmost position, and all others would lie proportionately between the two.

At step 146 the computer 11 derives participant position and/or velocity data. These data are used by computer 11 in step 147 as an input to the interactive entertainment experience that updates the display accordingly.

At step 148, that dynamic environment module 140 determines if more live images are to be acquired. If it is determined at step 148 that more light images are to be acquired, then that dynamic environment module 140 returns to repeat steps 143 through 148. However, it is determined at step 148 that no more images are to be acquired, then they dynamic environment module 140 then exits at step 149.

Figure 7:
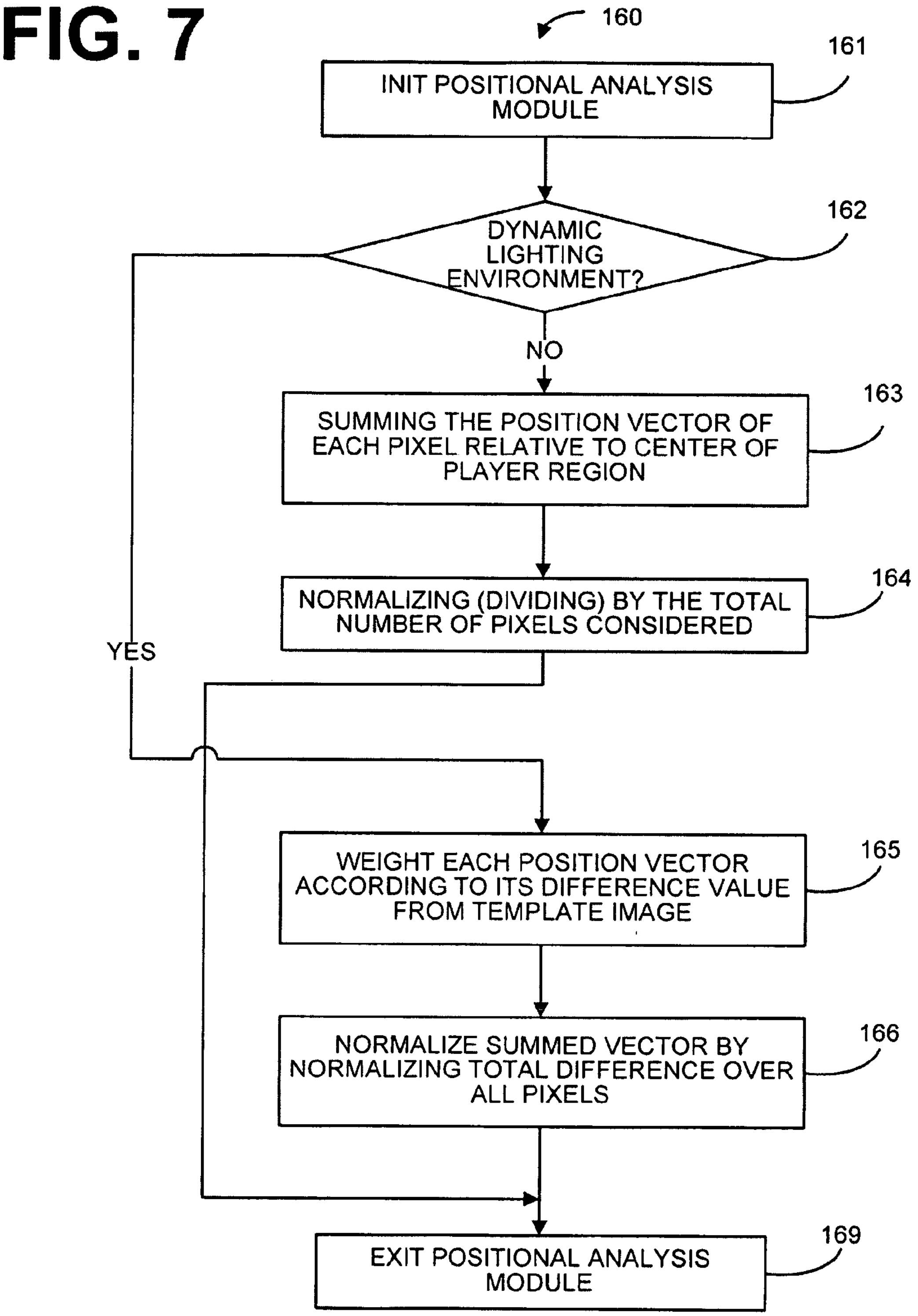
FIG. 7 is a flow chart illustrating an example of the operation of the positional analysis that is utilized in the dynamic environment module of the autonomic group interactivity system of the present invention, as shown in FIGS. 1-3 and 6.

FIG. 7 is a flow chart illustrating an example of the operation of the positional analysis module 160 that is utilized in the dynamic environment module 140 of the autonomic group interactivity system 10 of the present invention, as shown in FIGS. 1-3 and 6. Methodology to calculate the net position value. For a given player/axis region defined within the frame, a net position or input value is determined by calculating the centroid or center of mass of all pixels of interest within that region. To perform this calculation, two techniques have been considered.

In the first technique, every pixel of interest is considered as an equal point mass. The centroid is then calculated by summing the position vectors of each such pixel, relative to the center of the player region containing it and then normalizing (dividing) by the total number of pixels considered. Thus every pixel classified as different from the background, according to the threshold, is treated equally in determining the position.

In the second technique, each pixel of interest's position vector is weighted according to its difference value from the template image. And the result summed vector is then normalized by the total difference over all such pixels. Thus pixels with higher contrasts, with respect to the background, have more influence on the resulting position.

In general, the first technique is more 'fair' in representing all participants equally, independent of how much they contrast from the background either due to the color and texture of their clothing or due to uneven lighting levels across the play area. This technique is favored in situations where the environment is relatively constant, or when lighting is consistent but uneven across the frame. The second technique, on the other hand, is more robust to lighting and other moderate changes in the background, and thus is favored in situations where the environment is more dynamic.

First at step 161, the positional analysis module 160 is initialized. This initialization may include startup routines and processes embedded in the BIOS of the computer 11. The initialization also includes the establishment of data values for particular data structures utilized in the positional analysis module 160.

At step 162, it is determined if the environment is dynamically lit. A dynamically lit environment is an environment in which the lighting varies or is inconsistent. If it is determined at step 162 that the environment is dynamic, then the positional analysis module 160 then skips to step 165. However, if it is determined at step 162 that the environment is not dynamic, then the positional analysis module 160 performs the first technique described above.

At step 163, the positional analysis module 160 sums the position vector of each pixel relative to the center of the playing region. At step 164, the positional analysis module then normalizes the pixels by dividing the total number of pixels considered. Thus every pixel classified as different from the background according to the threshold set at step 142 (FIG. 6), is treated equally in determining the position. The positional analysis module 160 then skips to step 169.

At step 165, the positional analysis module 160 weighs each position vector according to its difference value from the template image. At step 166, the normalization of the first position vectors is performed by normalizing the summed up actors by the total normalized difference over all pixels.

At step 169, positional analysis module 160 exits.

Figure 8:
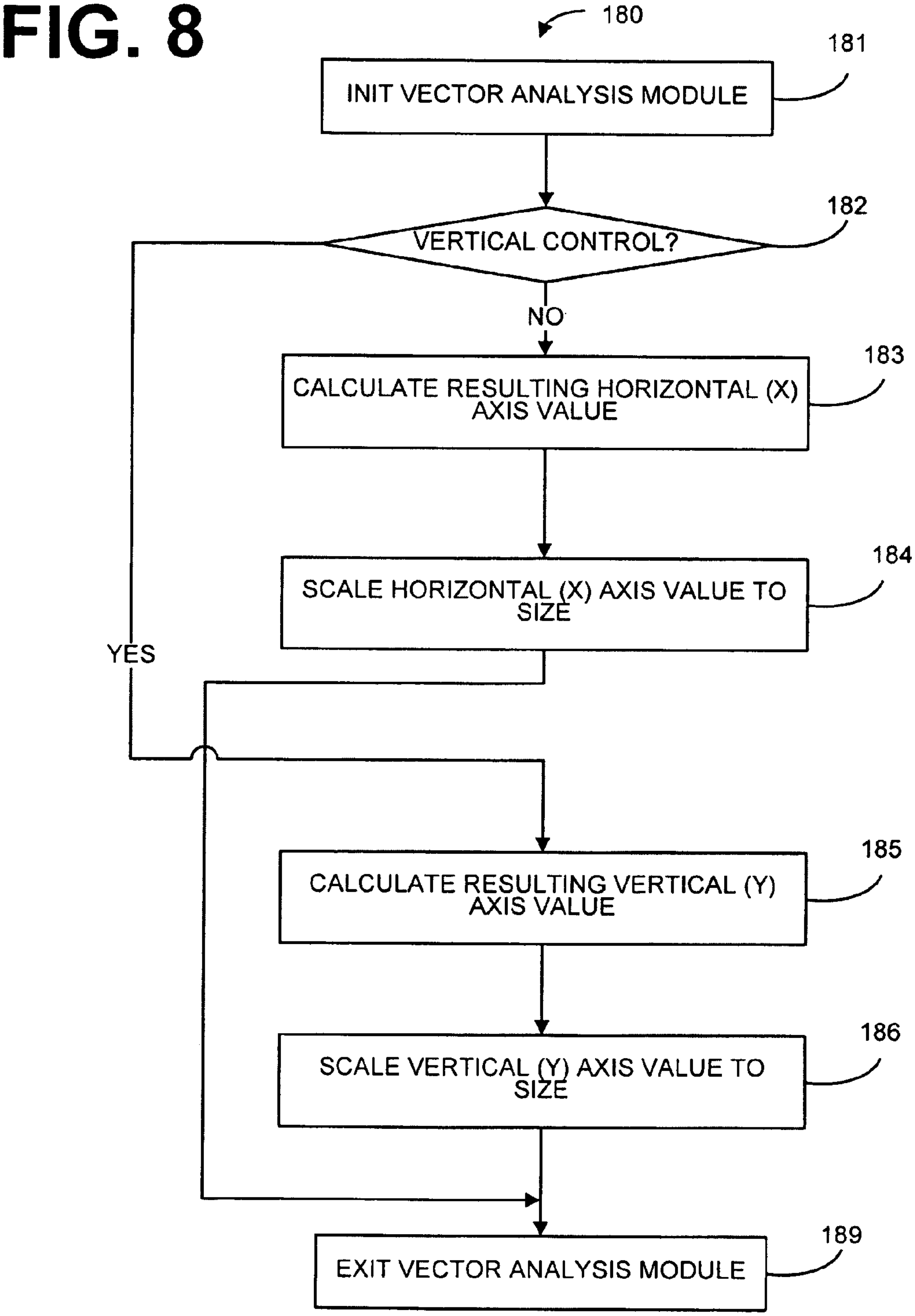
FIG. 8 is a flow chart illustrating an example of the operation of the vector analysis that is utilized in the dynamic environment module of the autonomic group interactivity system of the present invention, as shown in FIGS. 1-3 and 6.

FIG. 8 is a flow chart illustrating an example of the operation of the vector analysis module 180 that is utilized in the dynamic environment module 140 of the autonomic group interactivity system 10 of the present invention, as shown in FIGS. 1-3 and 6. In general, the position analysis is an intrinsically 2-D operation, i.e. the result is a centroid position vector in the plane of the camera view, however the control axes are typically one-dimensional and may or may not align 'nicely' to the camera view. Thus, some sort of transformation is usually required to map the centroid value to one or more control axis values. The method illustrated below is one example for calculating the resulting axis value will now be described.

Once the centroid of pixels of interest has been obtained, it is translated into a one-dimensional component or projection corresponding to the control axis defined for the current player region. For example, if the player region is defined to give horizontal (e.g. left-right) control, then the X component of the centroid is used, or similarly the Y component would be used for vertical control, and for some other arbitrary oblique axis, a projection of the centroid onto that axis would be used. This value is then scaled by the size of the player region in the specified axis direction, so that resulting output values are on the range [−1, 1].

First at step 181, the vector analysis module 180 is initialized. This initialization may include startup routines and processes embedded in the BIOS of the computer 11. The initialization also includes the establishment of data values for particular data structures utilized in the vector analysis module 180.

At step 182, is determined is the player region is defined to give vertical control. If it is determined at step 182 that the player region is defined to give a vertical control, then the vector analysis module 180 then skips the step 185. However, if it is determined at step 182 that vertical control is not defined, the vector analysis module 180 performs the horizontal axis control.

At step 183, the vector analysis module 180 calculates the resulting horizontal axis value. Thus, if the player region is defined to give horizontal (e.g. left-right) control, then the X component of the centroid is used. At step 184, this value is then scaled by the size of the player region in the horizontal axis direction, said that the resulting output values are in the range of [−1, 1]. The vector analysis module 180 then proceeds to step 189.

At step 185, the vector analysis module 180 calculates the resulting vertical axis value. Thus, if the player region is defined to give vertical (e.g. up-down) control, then the Y component of the centroid is used. At step 186, this value is then scaled by the size of the player region in the vertical axis direction, said that the resulting output values are in the range of [−1, 1].

At step 189, vector analysis module 180 exits.

Multiple imaging regions may be established in the live image frames to define groups of participants affecting different aspects of the interactive entertainment experience. By defining multiple regions (either disjoint or overlapping) within the field of view, and/or spanning multiple input cameras, multiple axes of control can be established, allowing for complex, multidimensional input (e.g., x, y, z positional control) and/or multiple distinct players (e.g. head-to-head or cooperative multiplayer experiences).

In addition to participant location and movement multiple discrete additional inputs can be used to control the game. These include, but are not limited to, a microphone 18, which may be used to acquire audio input from the participants. An on or off pulse can be affected by a measured spike or lull in participant audio levels relative to average background noise or by pattern matching on specific voice commands. This audio input is provided to the computer 11 to further control the interactive entertainment experience. Other inputs include but are not limited to, wireless and wired themed props for participant gameplay, as well as remotes for an operator to recalibrate, stop, start and advance gameplay. These additional inputs may have either discrete (on or off) or analog (some fraction between on and off) values.

Embodiments of the invention allow multiple participants to jointly contribute to and control the interactive entertainment experience. The participants do not require any device or token to provide interactive input. Multiple axes of control can be achieved through combinations of multiple camera regions, view angles, and audio input.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. A system for providing group interactivity, comprising:
at least one processor and a memory device;
means for capturing an image;
means for determining size of an audience in the image;
means for interacting in a small audience environment; and
means for interacting in a large audience environment;
wherein the small audience environment interacting means further comprising means for calibrating operation of the group interactivity using a template image;
wherein the calibrating means further comprising means for computing at least one threshold value for the template image; and
wherein the at least one threshold value is optimally set at a value just below a point where a significant amount of noise is detected.

2. The system of claim 1 wherein the small audience environment interacting means further comprising means for calculating a net position value of each of a plurality of pixels within the image.

3. The system of claim 2, wherein the net position value calculating means further comprises means for summing a position vector of each of the plurality of pixels and dividing by a total number of pixels considered.

4. The system of claim 2, wherein the net position value calculating means further comprises means for weighting each of the plurality of pixels by a difference value and dividing by a total number of pixels considered.

5. The system of claim 1 wherein the small audience environment interacting means further comprising means for calculating a vector value for the plurality of pixels within the image.

6. The system of claim 5, wherein the vector value calculating means further comprises means for translating the plurality of pixels into a one-dimensional component corresponding to a control axis for the image.

7. A system for providing group interactivity, comprising:
at least one processor and a memory device;
a module that determines a size of an audience in an image provided by an image acquisition device;
a module that controls interaction in a small audience environment;
a module that controls interaction in a large audience environment;
a module that calibrates operation of the group interactivity using a template image; and
a module that computes at least one threshold value for the template image, wherein the at least one threshold value is optimally set at a value just below a point where a significant amount of noise is detected.

8. The system of claim 7, further comprising a module that calculates a net position value of each of the plurality of pixels within the image.

9. The system of claim 8, wherein the net position value calculate module further comprises a module for summing a position vector of each of the plurality of pixels and dividing by a total number of pixels considered.

10. The system of claim 8, wherein the net position value calculate module further comprises a module for weighting each of the plurality of pixels by a difference value and dividing by a total number of pixels considered.

11. The system of claim 7, further comprising module that calculates a vector value for the plurality of pixels within the image for translating the plurality of pixels into a one-dimensional component corresponding to a control axis for the image.

12. A computer program product, the computer program product comprising:

a non-transitory storage medium readable by a processing circuit and storing instructions for execution by the processing circuit for performing a method comprising:

determining size of an audience in a image;

interacting in a small audience environment;

interacting in a large audience environment; and calibrating operation of the group interactivity using a template image that further comprises computing at least one threshold value for the template image, wherein the at least one threshold value is optimally set at a value just below a point where a significant amount of noise is detected.

13. The computer program product of claim 12, further comprising calculating a net position value of each of the plurality of pixels within the image.

14. The computer program product of claim 13, further comprising summing a position vector of each of the plurality of pixels and dividing by a total number of pixels considered.

15. The computer program product of claim 13, further comprising weighting each of the plurality of pixels by a difference value and dividing by a total number of pixels considered.

16. The computer program product of claim 12, further comprising calculating a vector value for the plurality of pixels within the image for translating the plurality of pixels into a one-dimensional component corresponding to a control axis for the image.

* * * * *